United States Patent
Chung et al.

(10) Patent No.: US 10,061,404 B2
(45) Date of Patent: Aug. 28, 2018

(54) OPTICAL NAVIGATION CHIP, OPTICAL NAVIGATION MODULE AND OPTICAL ENCODER

(71) Applicant: PIXART IMAGING INC., Hsin-Chu (TW)

(72) Inventors: Ching-Lin Chung, Hsin-Chu (TW); J R-Shen Yang, Hsin-Chu (TW); Chia-Fu Ke, Hsin-Chu (TW); Yen-Min Chang, Hsin-Chu (TW)

(73) Assignee: PIXART IMAGING INC., Hsin-Chu (TW)

(*) Notice: Subject to any disclaimer, the term of this patent is extended or adjusted under 35 U.S.C. 154(b) by 78 days.

(21) Appl. No.: 15/087,507

(22) Filed: Mar. 31, 2016

(65) Prior Publication Data
US 2016/0306446 A1 Oct. 20, 2016

(30) Foreign Application Priority Data
Apr. 17, 2015 (TW) .............................. 104112384 A

(51) Int. Cl.
*G06F 3/03* (2006.01)
*G06F 3/0354* (2013.01)
*G06F 1/16* (2006.01)

(52) U.S. Cl.
CPC ........ *G06F 3/03543* (2013.01); *G06F 1/1652* (2013.01); *G06F 3/0317* (2013.01)

(58) Field of Classification Search
CPC ... G06F 1/1652; G06F 3/0317; G06F 3/03543
See application file for complete search history.

(56) References Cited

U.S. PATENT DOCUMENTS

| 8,988,391 B2* | 3/2015 | Reigneau | G06F 3/0317 345/175 |
| 2009/0108175 A1* | 4/2009 | Grot | G06F 3/0317 250/206.1 |

(Continued)

FOREIGN PATENT DOCUMENTS

| TW | 201407448 A | 2/2014 |
| TW | 201500973 A | 1/2015 |

OTHER PUBLICATIONS

Haiyin Sun "A Practical Guide to Handling Laser Diode Beams", Feb. 20, 2015, SpringerBriefs in Physics, DOI 10.1007/978-94-017-9783-2_2, Chapter 2, pp. 27-51. ISBN: 978-94-017-9782-5.*

*Primary Examiner* — Siamak Harandi
(74) *Attorney, Agent, or Firm* — Li & Cai Intellectual Property (USA) Office

(57) ABSTRACT

The present disclosure illustrates an optical navigation chip. The optical navigation chip is disposed on an optical navigation module. The optical navigation module includes a light-emitting unit. The light-emitting unit provides a light beam to irradiate a surface of a displacement generating unit. The light beam has a low divergence angle to reduce scattering. The optical navigation chip includes a sensing array and a displacement calculating unit. The sensing array is disposed corresponding to the surface. The sensing array receives a reflected light beam which the surface reflects, and captures an image once every capturing interval based upon the reflected light beam. The displacement calculating unit calculates a relative displacement between the optical navigation chip and the surface according to the images.

19 Claims, 3 Drawing Sheets

(56) References Cited

U.S. PATENT DOCUMENTS

2012/0224188 A1 9/2012 Lin et al.
2013/0038535 A1* 2/2013 Chen .................. G06F 3/03543
 345/166
2015/0097778 A1 4/2015 Chang et al.

* cited by examiner

OPTICAL NAVIGATION CHIP, OPTICAL NAVIGATION MODULE AND OPTICAL ENCODER

BACKGROUND

1. Technical Field

The present disclosure relates to an optical navigation chip, in particular, to a microminiaturization optical navigation chip, an optical navigation module having the optical navigation chip and an optical encoder.

2. Description of Related Art

Following the technology, more and more electronic devices have an optical navigation function. An optical encoder having the optical navigation function usually disposes an optical navigation chip to perform the optical navigation function. For example, the most common optical encoder is an optical mouse.

The current optical mouse usually includes a light-emitting unit and the optical navigation chip. The light-emitting unit is configured for operatively providing a light beam to irradiate an object (such as a desktop). The optical navigation chip includes a sensing array. The sensing array is disposed corresponding to a surface of the object for receiving a reflected light beam reflected by the surface and capturing an image belonging to a part of the surface once every capturing interval. The optical mouse compares the images and calculates a displacement between a current position and a previous position of the optical mouse.

If the light-emitting unit does not include an optical lens, such as a condensing lens, the light beam provided by the light-emitting unit is easy to scatter, such that the light beam has a low light-intensity. Then, there are errors between the image captured by the sensing array and the actual image. Hence, the light-emitting unit usually comprises an optical lens disposed on a light-emitting port to focus the light beam. Moreover, in order to increase image clarity of the images captured by the sensing array, there is also an optical lens disposed on the sensing array to focus the reflected light beam.

However, as in the above descriptions, the conventional optical encoder needs the optical lenses to focus the light beam, such that a size of the optical encoder increases. It is difficult to simultaneously achieve high accuracy and microminiaturization for the optical encoder.

SUMMARY

An exemplary embodiment of the present disclosure provides an optical navigation chip. The optical navigation chip is disposed in an optical navigation module. The optical navigation module comprises a light-emitting unit. The light-emitting unit provides a light beam to irradiate a surface of a displacement generating unit. The light beam has a low divergence angle to reduce scattering. The optical navigation chip comprises a sensing array and a displacement calculating unit. The sensing array is disposed corresponding to the surface. The displacement calculating unit is coupled to the sensing array. The sensing array receives a reflected light beam reflected by the surface, and captures an image belonging to a part of the surface once every capturing interval based upon the reflected light beam. The sensing array does not comprise an optical lens to focus the reflected light beam. The displacement calculating unit is configured for operatively calculating a relative displacement between the optical navigation chip and the surface according to the images.

An exemplary embodiment of the present disclosure provides an optical navigation module. The optical navigation module comprises a light-emitting unit and an optical navigation chip. The light-emitting unit is configured for operatively providing a light beam to irradiate a surface of a displacement generating unit. The light beam has a low divergence angle to reduce scattering. The optical navigation chip comprises a sensing array and a displacement calculating unit. The sensing array is disposed corresponding to the surface. The displacement calculating unit is coupled to the sensing array. The sensing array receives a reflected light beam reflected by the surface, and captures an image belong to a part of the surface once every capturing interval based upon the reflected light beam. The sensing array does not comprise an optical lens to focus the reflected light beam. The displacement calculating unit is configured for operatively calculating a relative displacement between the optical navigation chip and the surface according to the images.

An exemplary embodiment of the present disclosure provides an optical encoder. The optical encoder comprises a displacement generating unit and an optical navigation module. The optical navigation module comprises a light-emitting unit and an optical navigation chip. The light-emitting unit is configured for operatively providing a light beam to irradiate a surface of the displacement generating unit. The light beam has a low divergence angle to reduce scattering. The optical navigation chip comprises a sensing array and a displacement calculating unit. The sensing array is disposed corresponding to the surface. The displacement calculating unit is coupled to the sensing array. The sensing array receives a reflected light beam reflected by the surface, and captures an image belonging to a part of the surface once every capturing interval based upon the reflected light beam. The sensing array does not comprise an optical lens to focus the reflected light beam. The displacement calculating unit is configured for operatively calculating a relative displacement between the optical navigation chip and the surface according to the images.

To sum up, compared to the conventional optical encoder, the optical navigation chip, the optical navigation module and the optical encoder provided by the present disclosure do not need any optical lens disposed on the light-emitting unit and the sensing array, and the optical navigation chip, the optical navigation module and the optical encoder can calculate the relative displacement between the optical navigation chip and the displacement generating unit of the optical encoder based on the images captured by the sensing array. Because the optical navigation chip, the optical navigation module and the optical encoder do not need the optical lens, the sizes of the optical navigation chip, the optical navigation module and the optical encoder can be reduced for microminiaturization.

In order to further understand the techniques, means and effects of the present disclosure, the following detailed descriptions and appended drawings are hereby referred to, such that, and through which, the purposes, features and aspects of the present disclosure can be thoroughly and concretely appreciated; however, the appended drawings are merely provided for reference and illustration, without any intention to be used for limiting the present disclosure.

BRIEF DESCRIPTION OF THE DRAWINGS

The accompanying drawings are included to provide a further understanding of the present disclosure, and are incorporated in and constitute a part of this specification. The drawings illustrate exemplary embodiments of the present disclosure and, together with the description, serve to explain the principles of the present disclosure.

DESCRIPTION OF THE EXEMPLARY EMBODIMENTS

Figure 1:
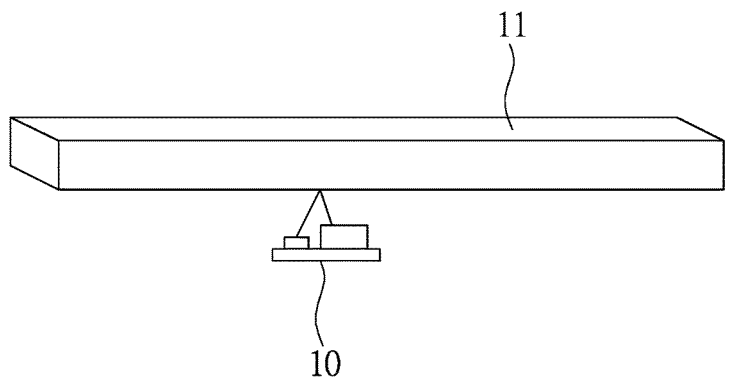
FIG. 1 is a schematic diagram illustrating an optical encoder according to an embodiment of the present disclosure.

Reference will now be made in detail to the exemplary embodiments of the present disclosure, examples of which are illustrated in the accompanying drawings. Wherever possible, the same reference numbers are used in the drawings and the description to refer to the same or like parts.

Notably, the terms first, second, third, etc., may be used herein to describe various elements, but these elements should not be affected by such terms. Such terminology is used to distinguish one element from another. Further, the term "or" as used herein may include any one or combinations of the associated listed items.

Please refer to FIG. 1, which is a schematic diagram illustrating an optical encoder according to an embodiment of the present disclosure. The optical encoder 1 includes an optical navigation module 10 and a displacement generating unit 11. The optical navigation module 10 is disposed corresponding to a surface of the displacement generating unit 11.

The optical navigation module 10 is configured for operatively providing a light beam and irradiating the surface of the displacement generating unit 11, and then receiving a reflected light beam which the surface of the displacement generating unit 11 reflects. Once every capturing interval, the optical navigation module 10 captures an image belonging to a part of the surface of the displacement generating unit 11 based upon the reflected light beam.

The displacement generating unit 11, such as a ring, a slide rail or a round tube, can be moved to generate a displacement. In certain applications, the displacement generating unit 11 can not be moved, and the optical navigation module 10 can be moved, such that a relative position between the optical navigation module 10 and the displacement generating unit 11 changes. A shape of the displacement generating unit 11 can change to support different applications.

For example, when the optical navigation module 10 is used in an optical mouse, the displacement generating unit 11 is a desktop. A user can operate the optical mouse to generate the displacement, and the optical navigation module 10 calculates how much displacement as the optical mouse moves on the desktop. Or, the optical navigation module 10 can be used in a syringe, and the displacement generating unit 11 is a plunger rod. When the plunger rod is pulled or pushed, the optical navigation module 10 can sense the displacement of the plunger rod.

In brief, when the relative position between the optical navigation module 10 and the displacement generating unit 11 changes, the optical navigation module 10 can determine the displacement of the optical navigation module 10 according to the images associated with the surface of the displacement generating unit 11, and calculate a relative displacement between the optical navigation module 10 and the displacement generating unit 11.

In the embodiment, the surface of the displacement generating unit 11 does not comprise any specific special pattern. In the event that it comprises a special pattern, the special pattern could be such as a recognition block, and a light reflection rate of the recognition block is different from a light reflection rate of the surface or the special pattern could be such as an etching pattern, and the etching pattern would be below the surface and form a notch. It should noted that the aforesaid special patterns are just taken as an example, but the present disclosure is not limited thereto.

Figure 2:
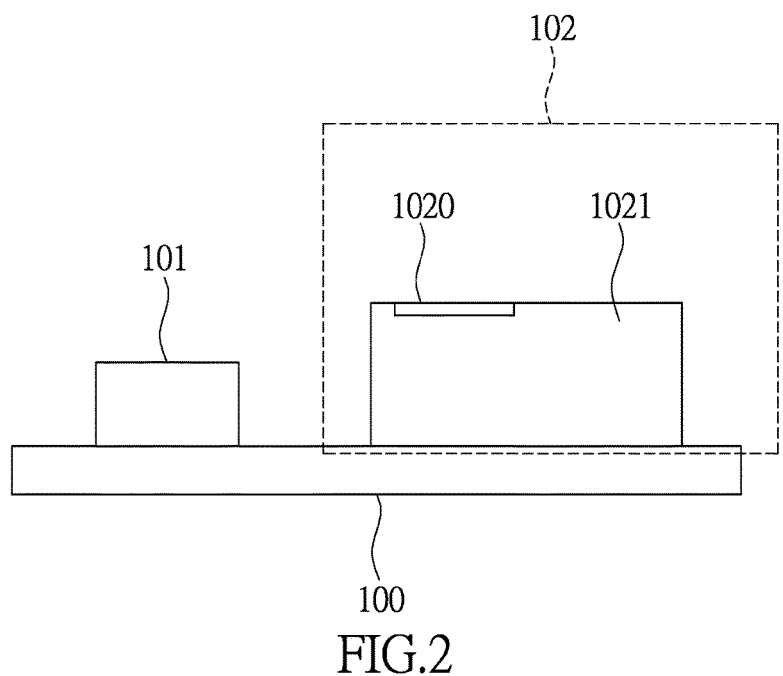
FIG. 2 is a schematic diagram illustrating an optical navigation module according to an embodiment of the present disclosure.

Please refer to FIG. 2, which is a schematic diagram illustrating an optical navigation module according to an embodiment of the present disclosure. The optical navigation module 10 includes a substrate 100, a light-emitting unit 101 and an optical navigation chip 102. The light-emitting unit 101 and the optical navigation chip 102 are disposed on the substrate 100. The substrate 100 is such as a printed circuit board (PCB). The light-emitting unit 101 is proximate to the optical navigation chip 102. A spacing distance between the light-emitting unit 101 and the optical navigation chip 102 can be changed based on practical demands, as long as the optical navigation chip 102 can receive the reflected light beam provided by the surface of the displacement generating unit (as the displacement generating unit 11 shown in FIG. 1).

The light-emitting unit 101, such as a laser diode or a light emitting diode, is configured for operatively providing the light beam to irradiate the surface of the displacement generating unit 11. The light beam provided by the light-emitting unit 101 has a low divergence angle. Thus, the light-emitting unit 101 does not need an optical lens to focus or expand the light beam for reducing scattering.

When the light-emitting unit 101 is the laser diode, the light-emitting unit 101 provides a laser light beam. The laser light beam with low divergence angle is hard to scatter. Hence, the laser diode can be used in the optical navigation module 10 directly. To put it concretely, the low divergence angle means that a horizontal divergence angle and a vertical divergence angle of the light beam are respectively less than 10 degrees and 35 degrees. When the light-emitting unit 101 is the light emitting diode, the light emitting diode is specially designed for providing the light beam with low divergence angle.

In brief, the light-emitting unit 101 can be a laser diode, a light emitting diode or other element which can provide a light beam with low divergence angle. Thus, the light-emitting port of the light-emitting unit 101 does not have to dispose an optical lens for focusing the light beam. Incidentally, the values of the low divergence angle mentioned above are just taken as an example, but the present disclosure is not limited thereto. Those skilled in the art can appropriately adjust the divergence angle of the light beam based on the divergence angle of the laser light beam to accomplish the optical navigation module 10 mentioned above.

The optical navigation chip includes a sensing array 1020 and a displacement calculating unit 1021. The sensing array 1020 is coupled to the displacement calculating unit 1021. The sensing array 1020, such as a Complementary Metal- Oxide Semiconductor (CMOS) image sensing array, or a Charge-coupled Device (CCD) image sensing array, is composed by a plurality of pixels forming a pixel matrix. Due to the optical navigation module 10 being disposed corresponding to the surface of the displacement generating unit 11, the sensing array 1020 receives the reflected light beam reflected by the surface and captures an image belonging to a part of the surface once every capturing interval based upon the reflected light beam.

As described previously, the light beam provided by the light-emitting unit 101 has a low divergence angle, such that the light beam is completely provided to the surface of the displacement generating unit 11. On the other hand, the surface of the displacement generating unit 11 completely reflects the light beam to the sensing array 1020. Thus, the sensing array 1020 can capture a clear image without setting up an optical lens to focus the reflected light beam.

Incidentally, light-cohesion of the laser light beam is higher than light-cohesion of the light beam provided by the light emitting diode. In the embodiment, the sensing array 1020 can obtain a clearer image when the optical navigation module 10 uses the laser diode as a light source.

The displacement calculating unit 1021 having an image processing function is configured for operatively receiving the image outputted by the sensing array 1020, and processes the images. Next, the displacement calculating unit 1021 calculates a relative displacement between the optical navigation chip 102 and the surface of the displacement generating unit 11 according to the images. The technique related to calculating the relative displacement is well known to those of ordinary skill in the art, thus it does not bear repeating herein.

After obtaining the relative displacement between the optical navigation chip 102 and the displacement generating unit 11, the displacement calculating unit 1021 outputs the calculated result to back-end circuits. Then the back-end circuits implement a corresponding function, such as moving a cursor of the mouse.

Figure 3:
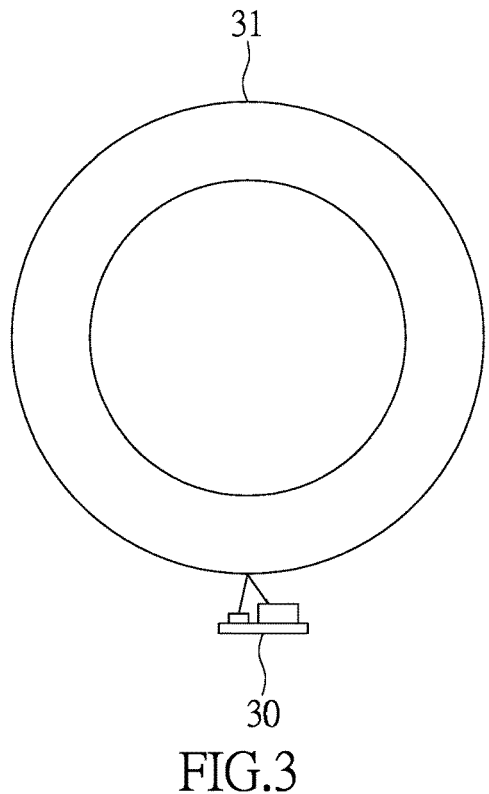
FIG. 3 is a schematic diagram illustrating an optical encoder according to an another embodiment of the present disclosure.

Please refer to FIG. 3, which is a schematic diagram illustrating an optical encoder according to an another embodiment of the present disclosure. The optical encoder 3 also includes an optical navigation module 30 and a displacement generating unit 31. Structures and functions of the optical navigation module 30 are similar to the optical navigation module 10 shown in FIG. 1, thus their descriptions are omitted, and therefore only differences between them will be described below.

Different from the optical navigation module 10 shown in FIG. 1, the displacement generating unit 31 of the optical encoder 3 is a ring. The optical navigation module 30 is disposed corresponding to an external surface of the displacement generating unit 31.

For example, the optical encoder 3 is used in a stereo system as a volume control knob. A user can adjust volume of the stereo system by turning the optical encoder 3. The optical navigation module 30 senses the external surface of the displacement generating unit 31 to calculate a relative displacement between an optical navigation chip of the optical navigation module 30 and the external surface of the displacement generating unit 31. Next, the optical navigation module 30 outputs the calculated relative displacement to a back-end circuit, such as a host, and then the back-end circuit correspondingly adjusts the volume of the stereo system.

Such as the embodiment mentioned above, the external surface of the displacement generating unit 31 can be a smooth surface without any special pattern or there can be at least one special pattern disposed on the external surface of the displacement generating unit 31 and the optical navigation module 30 can calculate the relative displacement between the optical navigation module 30 and the displacement generating unit 31 by using the special pattern.

Notably, in the embodiment, the external surface of the displacement generating unit 31 can further include a starting pattern. When the sensing array of the optical navigation module 30 detects the starting pattern, the displacement calculating unit of the optical navigation module 30 determines the displacement generating unit 31 has rotated one cycle and returned to a start point (such as the starting pattern).

Figure 4:
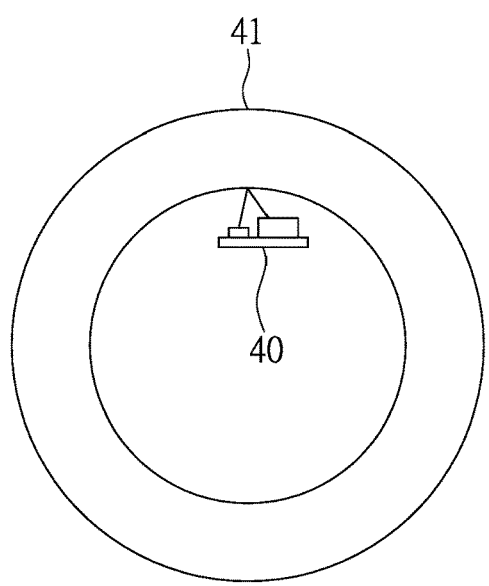
FIG. 4 is a schematic diagram illustrating an optical encoder according to an another embodiment of the present disclosure.

Please refer to FIG. 4, which is a schematic diagram illustrating an optical encoder according to an another embodiment of the present disclosure. The optical encoder 4 also includes an optical navigation module 40 and a displacement generating unit 41. Structures and functions of the optical navigation module 40 are similar to the optical navigation module 10 shown in FIG. 1 and the optical navigation module 30 shown in FIG. 3, thus their descriptions are omitted, and therefore only differences between them will be described below.

The displacement generating unit 41 of the optical encoder 4 is also a ring. Different from the optical encoder 3 shown in FIG. 3, the optical navigation module 40 is disposed corresponding to an inner surface of the displacement generating unit 41. A flow chart for the optical navigation module 40 calculating a relative displacement would be similar to that for the optical navigation module 30, and further descriptions are therefore omitted.

Figure 5:
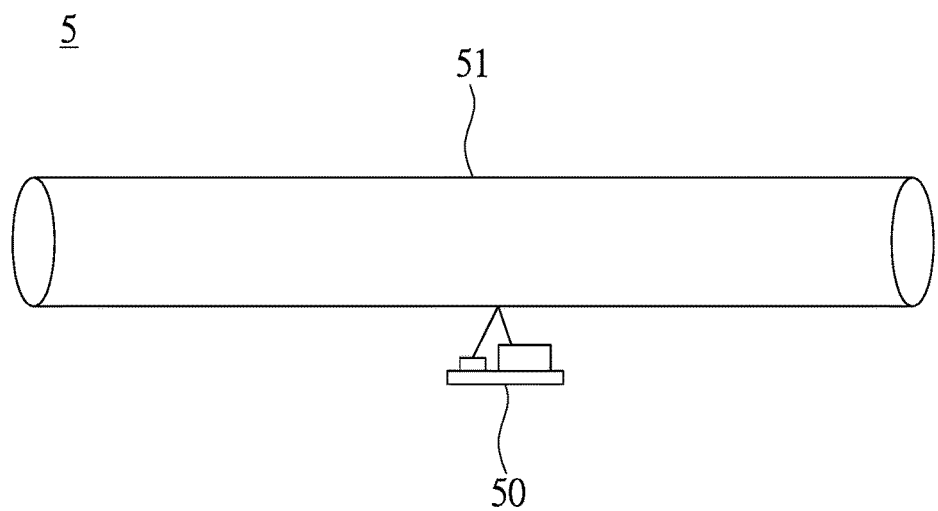
FIG. 5 is a schematic diagram illustrating an optical encoder according to an another embodiment of the present disclosure.

Please refer to FIG. 5, which is a schematic diagram illustrating an optical encoder according to an another embodiment of the present disclosure. The optical encoder 5 also includes an optical navigation module 50 and a displacement generating unit 51. Structures and functions of the optical navigation module 50 are similar to the optical navigation module 10 shown in FIG. 1, the optical navigation module 30 shown in FIG. 3 and the optical navigation module 40 shown in FIG. 4, thus their descriptions are omitted, and therefore only differences between them will be described below.

Different from the optical encoders 1, 3 and 4, the displacement generating unit 51 of the optical encoder 5 is a round tube. The optical navigation module 50 is disposed corresponding to an external surface of the displacement generating unit 51.

For example, the optical encoder 5 is a knob disposed at one side of a smart watch. A user can turn the knob to adjust time or date of the smart watch. When the knob is turned to generate a displacement, the optical navigation module 50 detects the external surface of the knob to calculate a relative displacement between an optical navigation chip of the optical navigation module 50 and the external surface of the knob. Next, the optical navigation module 50 outputs the calculated relative displacement to a back-end circuit (such as a processor of the smart watch), such that the back-end circuit correspondingly adjusts the time or the date of the smart watch.

Such as the embodiment mentioned above, the external surface of the displacement generating unit 51 can be a smooth surface without any special pattern or there can be at least one special pattern disposed on the external surface of the displacement generating unit 51. The external surface of the displacement generating unit 51 can further include a starting pattern. When the sensing array of the optical navigation module 50 detects the starting pattern, the displacement calculating unit of the optical navigation module 50 determines the displacement generating unit 51 has rotated one cycle.

In summary, compared to the conventional optical encoder, the optical navigation chip, the optical navigation module and the optical encoder provided by the present disclosure do not need any optical lens disposed on the light-emitting unit and the sensing array, and the optical navigation chip, the optical navigation module and the optical encoder can calculate the relative displacement between the optical navigation chip and the displacement generating unit of the optical encoder based on the images captured by the sensing array. Because the optical navigation chip, the optical navigation module and the optical encoder do not need the optical lens, the sizes of the optical navigation chip, the optical navigation module and the optical encoder can be reduced for microminiaturization.

Furthermore, the present disclosure uses the laser diode as the light resource. Due to the laser light beam provided by the laser diode having high cohesion, high directionality and high light-intensity, the optical navigation chip can capture the images with high image clarity. Hence, the optical navigation chip can precisely calculate the relative displacement based on the images with high image clarity.

The above-mentioned descriptions represent merely the exemplary embodiment of the present disclosure, without any intention to limit the scope of the present disclosure thereto. Various equivalent changes, alterations or modifications based on the claims of present disclosure are all consequently viewed as being embraced by the scope of the present disclosure.

What is claimed is:

1. An optical navigation chip, disposed in an optical navigation module, wherein the optical navigation module comprises a light-emitting unit, the light-emitting unit provides a light beam to irradiate a surface of a displacement generating unit, and the optical navigation chip comprising:
    a sensing array, arranged to face the surface of the displacement generating unit, receiving a reflected light beam reflected by the surface of the displacement generating unit, and capturing an image belonging to the surface once every capturing interval based upon the reflected light beam, wherein the sensing array is configured to directly receive the reflected light beam without any intervening optical lens for optical processing; and
    a displacement calculating unit, coupled to the sensing array, configured for operatively calculating a relative displacement between the optical navigation chip and the surface according to the images,
    wherein the surface of the displacement generating unit has a starting pattern, when the sensing array detects the starting pattern, the displacement calculating unit determines the displacement generating unit has rotated one cycle.

2. The optical navigation chip according to claim 1, wherein the sensing array is a complementary metal oxide semiconductor (CMOS) image sensing array.

3. The optical navigation chip according to claim 1, wherein the light-emitting unit is a laser diode to provide a laser light beam.

4. The optical navigation chip according to claim 1, wherein the light beam has a low divergence angle to reduce scattering, wherein a horizontal divergence angle and a vertical divergence angle of the light beam are respectively less than 10 degrees and 35 degrees.

5. The optical navigation chip according to claim 1, wherein the displacement generating unit is a ring or a round tube, wherein the surface is an external surface or an inner surface of the ring, or is an external surface of the round tube.

6. An optical navigation module, comprising:
    a light-emitting unit, configured for operatively providing a light beam to irradiate a surface of a displacement generating unit; and
    an optical navigation chip, having:
        a sensing array, arranged to face the surface, receiving a reflected light beam reflected by the surface, and capturing an image belong to the surface once every capturing interval based upon the reflected light beam, wherein the sensing array is configured to directly receive the reflected light beam without any intervening optical lens for optical processing; and
        a displacement calculating unit, coupled to the sensing array, configured for operatively calculating a relative displacement between the optical navigation chip and the surface according to the images,
    wherein the surface of the displacement generating unit has a starting pattern, when the sensing array detects the starting pattern, the displacement calculating unit determines the displacement generating unit has rotated one cycle.

7. The optical navigation module according to claim 6, wherein the sensing array is a CMOS image sensing array.

8. The optical navigation module according to claim 6, wherein the light-emitting unit is a laser diode to provide a laser light beam.

9. The optical navigation module according to claim 6, wherein the light beam has a low divergence angle to reduce scattering, wherein a horizontal divergence angle and a vertical divergence angle of the light beam are respectively less than 10 degrees and 35 degrees.

10. The optical navigation module according to claim 6, wherein the displacement generating unit is a ring or a round tube, wherein the surface is an external surface or an inner surface of the ring, or is an external surface of the round tube.

11. An optical encoder, comprising:
    a displacement generating unit, having a surface; and
    an optical navigation module, having:
        a light-emitting unit, configured for operatively providing a light beam to irradiate a surface of a displacement generating unit; and
        an optical navigation chip, having:
            a sensing array, arranged to face the surface of the displacement generating unit, receiving a reflected light beam reflected by the surface of the displacement generating unit, and capturing an image belonging to the surface once every capturing interval based upon the reflected light beam, wherein the sensing array is configured to directly receive the reflected light beam without any intervening optical lens for optical processing; and
            a displacement calculating unit, coupled to the sensing array, configured for operatively calculating a relative displacement between the optical navigation chip and the surface according to the images,
        wherein the surface of the displacement generating unit has a starting pattern, when the sensing array detects the starting pattern, the displacement calculating unit determines the displacement generating unit has rotated one cycle.

12. The optical encoder according to claim 11, wherein the sensing array is a CMOS image sensing array.

13. The optical encoder according to claim 11, wherein the light-emitting unit is a laser diode to provide a laser light beam.

14. The optical encoder according to claim 11, wherein the displacement generating unit is a ring, a slide rail or a round tube.

15. The optical encoder according to claim 11, wherein the displacement generating unit is a ring, the surface is an external surface or an inner surface of the ring.

16. The optical encoder according to claim 11, wherein the displacement generating unit is a round tube, the surface is an external surface of the round tube.

17. The optical encoder according to claim 11, wherein the surface of the displacement generating unit does not comprise a special pattern.

18. The optical encoder according to claim 11, wherein the light-emitting unit does not comprise an optical lens to focus the light beam.

19. The optical encoder according to claim 11, wherein the light beam has a low divergence angle to reduce scattering, wherein a horizontal divergence angle and a vertical divergence angle of the light beam are respectively less than 10 degrees and 35 degrees.

* * * * *